United States Patent [19]

Cline

[11] 4,080,643
[45] Mar. 21, 1978

[54] AIRCRAFT STATIC DISCHARGER

[75] Inventor: Jay D. Cline, Fort Lauderdale, Fla.

[73] Assignee: Dayton-Granger Aviation, Inc., Fort Lauderdale, Fla.

[21] Appl. No.: 789,351

[22] Filed: Apr. 21, 1977

[51] Int. Cl.² .......................... B64D 45/02; H05F 3/00
[52] U.S. Cl. .................................. 361/218; 361/222
[58] Field of Search ............... 361/212, 217, 218, 222

[56] References Cited

U.S. PATENT DOCUMENTS

| | | | |
|---|---|---|---|
| 3,034,020 | 5/1962 | Benkoczy et al. | 361/218 |
| 3,170,087 | 2/1965 | Tanner et al. | 361/218 |
| 3,558,976 | 1/1971 | Miller et al. | 361/218 |
| 3,579,033 | 5/1971 | Phillips | 361/218 |
| 3,617,805 | 11/1971 | Truax | 361/218 |
| 3,633,068 | 1/1972 | Miller | 361/218 |
| 3,742,300 | 6/1973 | Floyd | 361/218 |

FOREIGN PATENT DOCUMENTS 1,010,490 11/1965 United Kingdom ................ 361/218

Primary Examiner—Gerald Goldberg
Attorney, Agent, or Firm—Biebel, French & Nauman

[57] ABSTRACT

A static discharger for use on aircraft includes an elongated nylon body, and an internal resistance element is in the form of a fiber glass rod having conductive coating thereon received within an elongated opening formed in the body. The remote end of the conductive rod is mechanically and electrically bonded to a transversely oriented tungsten corona discharge needle, while the inner end of the rod is mechanically and electrically connected to a mounting base portion through a spring arrangement by means of which the differences in thermal coefficients of expansion between the body and the rod are accommodated. In one embodiment a stainless steel coil spring is used, and in another embodiment, the spring takes the form of a block of conductive rubber. A lighting diverter strip is formed along an outside surface of the nylon body.

11 Claims, 10 Drawing Figures

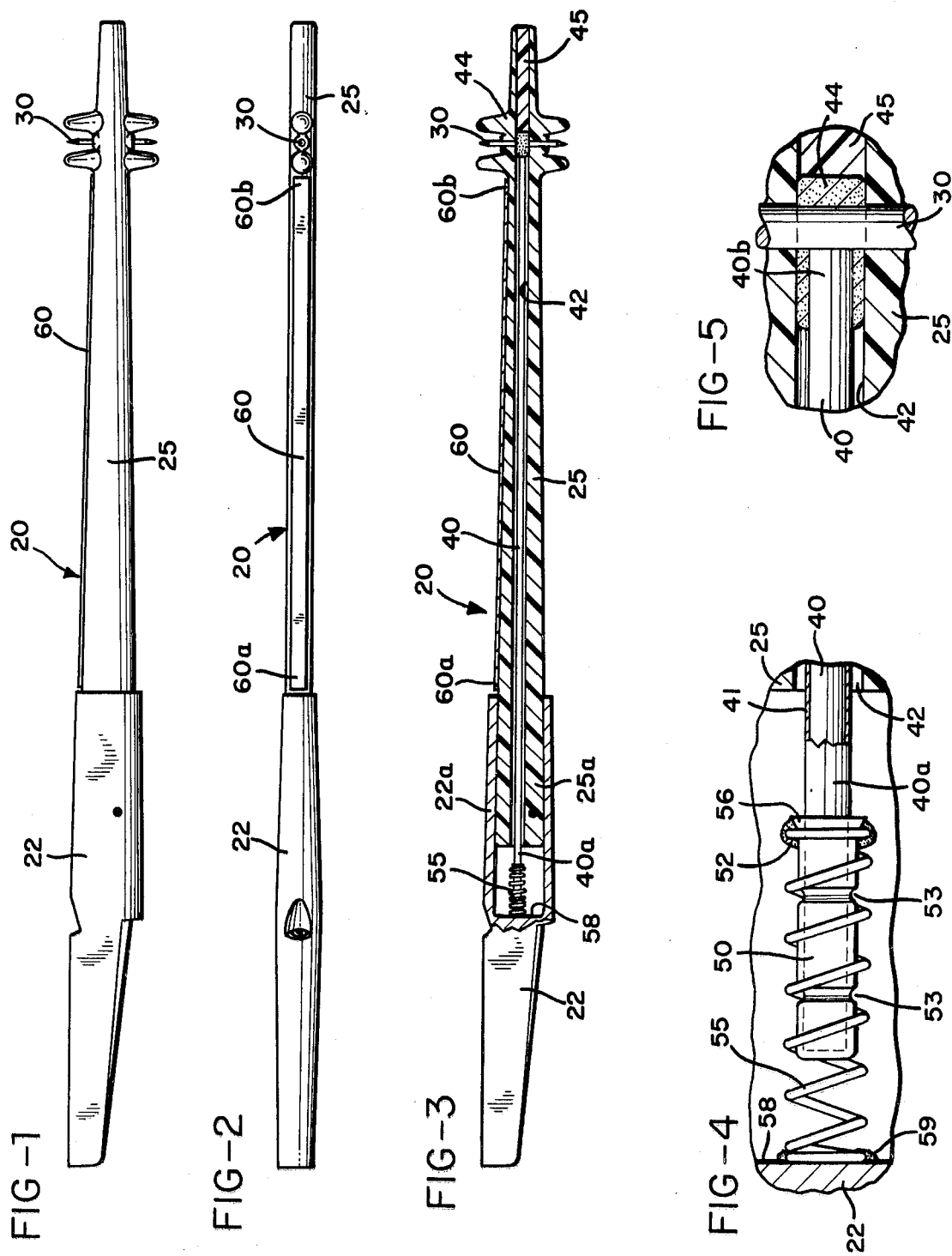

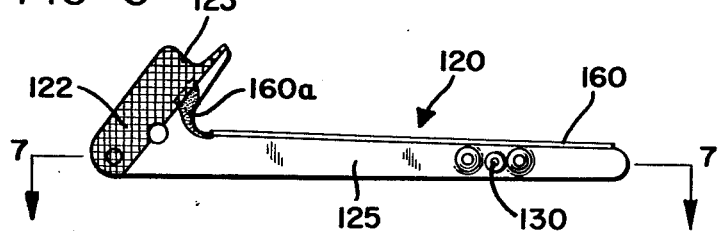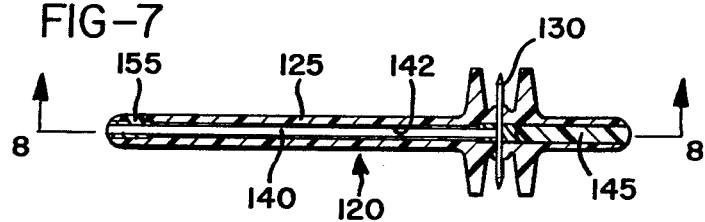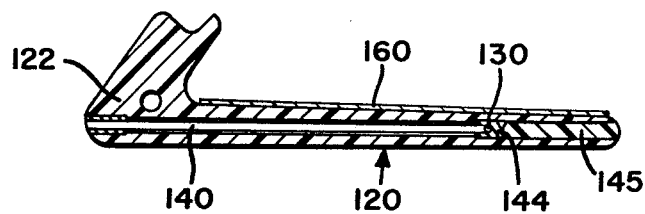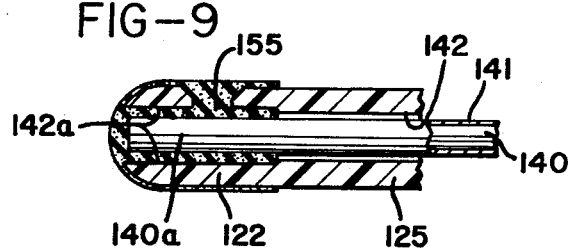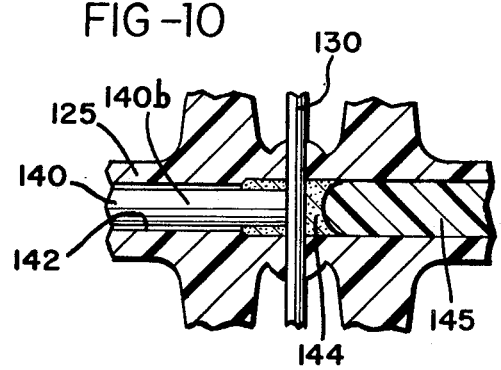

AIRCRAFT STATIC DISCHARGER

BACKGROND OF THE INVENTION

This invention constitutes an improvement to the static discharge devices described and claimed in the U.S. patents of Tanner et al, U.S. Pat. No. 3,170,087 granted Feb. 16, 1965 and Phillips, U.S. Pat. No. 3,579,033 granted May 18, 1971.

In U.S. Pat. No. 3,170,087, a discharger is disclosed as having an elongated body member which was externally coated with high resistance paint, such as an epoxy base paint containing lamp-black and graphite. The conductive coating on the exterior surface of the body provided a resistive coupling between the base and a transversely oriented corona discharge pin. It was found, however, that while the exterior resistance coating was satisfactory for the purpose intended, it was subject to erosion and damage due to the extreme environmental conditions encountered in flight on jet aircraft.

In U.S. Pat. No. 3,579,033, a non-conductive body was formed of nylon with a central aperture or opening extending therethrough, and the transverse corona discharge pin intersected the opening. The opening was filled by injection with electrical resistance material consisting of a thermosetting epoxy having dispersed therein electrical carbon and graphite to provide the desired conduction path. The arrangement shown and claimed in U.S. Pat. No. 3,579,033 achieved commercial success. However, in manufacture it was found that the actual resistance was somewhat difficult to predict and to maintain in production, and the scrap rate was high. Also, only low temperature cures were possible due to the use of a nylon discharger body.

SUMMARY OF THE INVENTION

The present invention is directed to a discharger of the general type previously described, in which a conductive coated fiber glass rod is inserted within a central opening formed in the discharger body. The remote end of the rod is electrically and mechanically connected to the transversely oriented tungsten corona discharge pin by means of a suitable bonding, electrically-conductive epoxy. The remaining length of the resistive fiber glass rod is free to move with the nylon body, and has its inner end electrically connected to the mounting base portion of the discharger.

A fiber glass rod coated with a conductive carbon coating and cured at high temperature provides a highly predictable and stable resistance element. Also, fiber glass has a relatively low thermal coefficient of expansion, and the conductive and cured coating applied to the exterior surface thereof maintains its integrity in use over a wide range of temperatures, and can predictably be made at low cost to have a desired resistance in the order of 10 to 100 megohms.

The nylon body, on the other hand, has a higher thermal coefficient of expansion than that of the fiber glass rod. Thus as the temperature decreases in flight, often down to −40° F or more, the nylon body decreases in size linearly while the fiber glass rod remains substantially constant in length. To accommodate this differential expansion and contraction in use, the inner end of the rod is electrically and mechanically connected to the body portion of the discharger through spring means.

In one embodiment the spring means takes the form of a stainless steel coil spring, and in another embodiment a conductive elastomer, such as conductive silicone rubber, is employed. If desired, a lightning diverter strip may be applied along an outer surface of the nylon body. The lightning diverter strip consists of powdered aluminum and epoxy binder material applied along an outer surface of the body. It has been found that the linear expansion and contraction of the discharger body does not adversely affect the integrity of such a lightning diverter strip.

It is accordingly an object of this invention to provide an improved discharger in which a resistance coated rod is mechanically and electrically attached to a discharge needle at a region within a plastic body and is mechanically and electrically attached to a mounting base portion through spring means which may take the form of a coil spring or a conductive elastomer, to accommodate relative movements between these parts due to differential expansion, and to assure the maintenance of the electrical connection between the rod and the pin.

Another object of this invention is the provision of a static discharger construction comprising an improvement in the structure as shown in U.S. Pat. Nos. 3,170,087 and 3,579,033.

A further object of the invention is the provision of a static discharger for use on aircraft, as previously defined, incorporating an integral lightning diverter strip thereon.

These and other objects and advantages of the invention will be apparent from the folllowing description, the accompanying drawings and the appended claims.

BRIEF DESCRIPTION OF THE DRAWINGS

FIG. 1 is a side view of one embodiment of a discharger according to this invention;

FIG. 2 is a top view thereof;

FIG. 3 is a longitudinal section therethrough;

FIG. 4 is an enlarged fragmentary view of a portion of FIG. 3;

FIG. 5 is another enlarged sectional fragmentary view showing the attachment of the rod to the pin;

FIG. 6 is a side view of another embodiment of the invention;

FIG. 7 is a horizontal sectional view taken generally along the line 7—7 of FIG. 6;

FIG. 8 is a section looking generally along the line 8—8 of FIG. 7;

FIG. 9 is an enlarged fragmentary section of the left hand portion of FIG. 7; and FIG. 10 is an enlarged fragmentary section of the right hand portion of FIG. 7 at the discharge pin.

DESCRIPTION OF THE PREFERRED EMBODIMENTS

A discharger for use on aircraft is illustrated generally at 20 in FIGS. 1 and 2 as having an aluminum base 22 by means of which a discharger may be connected conventionally to an aircraft. For the purpose of this description, it is understood that the discharger may be removably joined to a base support in the manner illustrated and disclosed in U.S. Pat. No. 3,579,033.

The base 22 is provided with a hollow end 22a which receives and supports one end of an axially elongated hollow nylon body 25. Thus, the inner end 25a (FIG. 3) of the body 25 is received partially within the end 22a of the base 22 and extends axially therefrom.

Adjacent the remote end of the body 20 there is provided a transversely oriented tungsten discharge pin 30 substantially in the manner disclosed in U.S. Pat. No. 3,579,033. The pin 30 is thus mechanically attached to the nylon body 25, and will move with this body in the event of thermal expansion or contraction of the body over the wide range of temperatures to which the discharger is subjected in use.

Means for electrically coupling the pin 30 to the base 22 comprises a conductive rod member 40 received within an axial opening 42 formed throughout the length of the body 25. The conductive rod member 40 is preferably formed of fiber glass material having baked on the outside surface thereof a conductive carbon coating 41. The conductive coating may comprise a mixture of a conductive carbon such as Conductex SC sold by Columbia Carbon, 380 Madison Avenue, New York, New York 10017, mixed with an epoxy adhesive, and applied to the rod uniformly about the surface thereof and cured at an elevated temperature. The amount of conductive material applied will determine the resistance of the rod as is well known in the art, and such rods can consistently be manufactured to provide a conductive path having a resistance in the order of nominal 17 megohms, but in any event falling within the range of 10 megohms minimum to 100 megohms maximum after cure. It is known that such conductive fiber glass rods are highly stable in use as resistors and are relatively immune from failure due to environmental temperature conditions.

The inner end 40a of the rod 40 extends into the space within the base portion 22a inwardly of the inner end 25a of the nylon body 25. The outer or remote end of the rod 40 is received in abutment with the transverse pin 30 at the region where this pin intersects the opening 42 as illustrated in FIG. 5. An electrical and mechanical bond is formed between the rod 40 at its outer end 40b and the pin 30 by a quantity of electrically conductive epoxy 44, which may be injected into place through the outer end of the opening 42. Conductive epoxy, type 200 of Gulf & Western Industrial Products Co., 101 Chester Road, Swarthmore, Pennsylvania 19081, may be used. The open end of the body 25 is sealed with a suitable plastic sealant 45.

The major portion of the rod 40 is free to move within the body 25. The inner end 40a is provided with a brass sleeve eyelet 50 received over the inner end 40a of the rod 40. The eyelet 50 is crimped at 53 to form a mechanical and electrical attachment to the rod 40.

Conductive spring means urging the rod 40 against the pin 30 and providing for relative movement comprises a stainless steel coil spring 55. The spring 55 is received within the end 22a of the base 22 and is telescoped over the major portion of the eyelet 50. The outer end of the spring is engaged against a flared collar 56 formed on the eyelet 50 and cemented in place with conductive epoxy 56, while the inner end of the spring rests in abutment with a wall 58 of the base 22. The inner end is similarly bonded to the base by a quantity 59 of the conductive epoxy. The stainless steel spring 55 thus permits relative movement between the inner end 40a of the rod 40 caused by the expansion and contraction of the nylon body 25 and additionally provides an electrically conductive path between the base 22 and the rod 40. Further, the spring 55 assures the maintenance of the contact between the end 40b and the pin 30, as shown in FIG. 5.

It is preferred to apply a lightning diverter strip to the discharger. For this purpose a ribbon 60 of conductive aluminum powder is applied to an epoxy substrate along an exterior surface of the body 25 in a longitudinal groove in the body with the inner end 60a thereof terminating in spaced relation to the base 22, and the outer end 60b terminating adjacent but spaced from the pin 30. The lightning diverter strip provides a lightning attachment path in the manner described in connection with the diverter strip 60 of the U.S. patent of Truax, U.S. Pat. No. 3,617,805 issued Nov. 2, 1971. In the event of a lightning attachment, it will jump the small gap to the base. The energy will be contained on the outer surface of the body, and the diverter is capable of taking multiple strikes.

Referring to the embodiment of FIGS. 6-10 (where like parts corresponding to the preceding embodiment are referred to with like reference numerals, plus 100). This represents a relatively shorter discharger operating on the same principles as that of the preceding embodiment. It is used where a shorter protrusion or extension is desired, such as on wing tips or the like. The general configuration corresponds to the discharger illustrated and described in connection with FIGS. 4 through 7 of U.S. Pat. No. 3,579,033.

A base portion 122 of the nylon body 125 is provided with a conductive coating 123 by means of which electrical contact is made with a suitable base support, not shown. The nylon body 125 is hollow, and is thus formed with an axial opening 142. The tungsten pin 130 is supported adjacent near the end of the discharger, and extends transversely through the opening 142. A coated fiber glass rod 140 is received within the body 125 with its end 140b in electrical and mechanical abutment with the pin 130 and is retained by a quantity of conductive epoxy 144. The rod 140 is similarly provided with a cured or baked-on conductive coating 141 throughout its length.

Since the rod 140 and the body 125 are of relatively shorter overall lengths than those of the preceding embodiment, the differential movements by reason of thermal expansion and contraction are correspondingly less. Accordingly, the spring means in this embodiment may take the form of a quantity of conductive elastomer 155, such as conductive rubber. This conductive elastomer, such as a silicone rubber mixed with carbon, supports the end 140a of the rod 140 and is injected within an enlarged portion 142a formed in the end of the body 125. The conductive rubber 155 fills the space in the body 125 surrounding the end 140a and provides for slight relative movement of the rod 140 within the body 125 by compression of the rubber. The conductive rubber 155 also provides an electrical path from the coating 123 on the base portion 122 to the coating 145 on the rod 140.

A lightning diverter strip 160 may be applied to an outer surface of the body 120. The lightning diverter strip is extended at its root end by a conductive coating extension 160a for connection to the conductive coating formed on the base portion 122.

It will therefore be seen that static dischargers are provided which employ the transverse corona discharge pin and which utilize the improved electrical performance and lower manufacturing cost of an internal resistance element consisting of a coated glass rod. The relatively high curing temperature required in the manufacture of such resistance elements assures that they remain stable throughout the useful life of the discharger.

While the forms of apparatus herein described constitute preferred embodiments of this invention, it is to be understood that the invention is not limited to these precise forms of apparatus, and that changes may be made therein without departing from the scope of the invention.

What is claimed is:

1. An aircraft static discharger comprising a base portion, an elongated body extending from said base portion, means in said body defining an axial opening therein, a transversely oriented discharge pin positioned at a remote end of said body and intersecting said opening, a conductive rod member received in said body opening having an outer end thereof in abutment with said pin and having an inner end thereof received in said base portion, and spring means urging said conductive member against said pin and providing for relative movement due to differential thermal expansion between said member and said body.

2. The discharger of claim 1 in which said spring means is a coil spring in said base portion and having one end partially telescoped over said inner end of said member, and means on said member inner end for locating said spring thereon.

3. The discharger of claim 1 in which said spring means is a block of conductive elastomer material in said base portion in engagement with said member at said inner end thereof.

4. The discharger of claim 1 further comprising a quantity of conductive epoxy material in said opening at the abutment of said member and said pin forming an electrical and mechanical bond therebetween.

5. The discharger of claim 1 in which said member is a conductive coated fiber glass rod.

6. The discharger of claim 1 further comprising a lightning diverter strip formed on an outer surface of said body extending from said base and terminating adjacent the remote end thereof and in spaced relation to said pin.

7. The static discharger for use on aircraft and the like comprising an elongated body formed of nylon and having an axial opening extending at least partially therethrough leading from an inner end of said body to an outer end of said body, base means associated with said body inner end for electrical and mechanical attachment to an aircraft, transversely oriented corona discharge pin means adjacent said outer end and in intersecting relation to said opening, a rod formed of fiber glass material having a conductive resistance coating thereon and received within said opening with an outer end of said rod butted against said pin means and an inner end thereof extending into said base means, and spring means in said base means urging said rod into engagement with said pin means, said spring means also providing an electrical conduction path between the resistance coating on said rod and said base means.

8. The static discharger of claim 7 in which said spring means comprises a stainless steel coil spring having an end connected to said rod and having another end connected to said base means.

9. The static discharger of claim 7 in which said spring means comprises a quantity of conductive rubber received in said base means in surrounding relation to the inner end of said rod.

10. The static discharger of claim 7 further comprising a quantity of conductive epoxy material in said opening in the region of the abutment of the outer end of said rod and said pin means forming a mechanical and electrical bond therebetween.

11. The discharger of claim 7 further comprising means on said body defining an axially elongated lightning diverter strip having one end thereof electrically connected to said base means and having an opposite end thereof terminated in said spaced relation to said pin means.

* * * * *